United States Patent
Cho et al.

(10) Patent No.: US 11,617,384 B2
(45) Date of Patent: Apr. 4, 2023

(54) FERMENTED SOYBEAN COMPOSITION AND METHOD FOR PRODUCING FERMENTED SOYBEAN COMPOSITION

(71) Applicant: CJ CHEILJEDANG CORPORATION, Seoul (KR)

(72) Inventors: Ha Na Cho, Suwon-si (KR); Sun A Cho, Suwon-si (KR); Duk Jin Kim, Suwon-si (KR); Hye Won Shin, Seoul (KR); Dae Seong Yoon, Yeoju-si (KR); Seon Mi Oh, Suwon-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 0 days.

(21) Appl. No.: 16/772,070

(22) PCT Filed: Dec. 10, 2018

(86) PCT No.: PCT/KR2018/015638
§ 371 (c)(1),
(2) Date: Jun. 11, 2020

(87) PCT Pub. No.: WO2019/117570
PCT Pub. Date: Jun. 20, 2019

(65) Prior Publication Data
US 2021/0068433 A1 Mar. 11, 2021

(30) Foreign Application Priority Data
Dec. 12, 2017 (KR) .................. 10-2017-0170570

(51) Int. Cl.
*A23L 11/50* (2021.01)
*A23L 7/104* (2016.01)
*A23L 3/3472* (2006.01)

(52) U.S. Cl.
CPC ............. *A23L 11/50* (2021.01); *A23L 3/3472* (2013.01); *A23L 7/104* (2016.08); *A23V 2002/00* (2013.01)

(58) Field of Classification Search
CPC ........ A23L 11/50; A23L 7/104; A23L 3/3472; A23V 2002/00
USPC .......................................................... 426/18
See application file for complete search history.

(56) References Cited

U.S. PATENT DOCUMENTS

| | | | |
|---|---|---|---|
| 10,080,381 B2 | 9/2018 | Jang et al. | |
| 10,226,441 B2 | 3/2019 | Higashi et al. | |
| 2002/0160079 A1* | 10/2002 | Kim .................. | A23L 27/50 426/44 |
| 2012/0282243 A1* | 11/2012 | Endo .................. | A23L 33/18 424/115 |
| 2014/0356481 A1 | 12/2014 | Toyoshima et al. | |
| 2015/0305376 A1 | 10/2015 | Oh et al. | |
| 2017/0000171 A1 | 1/2017 | Jang et al. | |
| 2017/0360733 A1 | 12/2017 | Higashi et al. | |
| 2018/0249740 A1* | 9/2018 | Kim .................. | A23L 11/70 |
| 2020/0329748 A1 | 10/2020 | Oh et al. | |

FOREIGN PATENT DOCUMENTS

| | | |
|---|---|---|
| CN | 1373206 A | 10/2002 |
| CN | 104508115 A | 4/2015 |
| CN | 106231922 A | 12/2016 |
| EP | 3231437 A1 | 10/2017 |
| JP | 2011-078331 A | 4/2011 |
| JP | 2014-204715 A | 10/2014 |
| JP | 2016-536994 A | 12/2016 |
| KR | 10-2002-0069788 A | 9/2002 |
| KR | 10-2003-0002893 A | 1/2003 |
| KR | 10-1135249 B1 | 4/2012 |
| KR | 2014-0004016 A | 1/2014 |
| KR | 10-1507658 B1 | 3/2015 |
| KR | 2017-0046844 A | 5/2017 |
| KR | 10-1881706 B1 | 7/2018 |
| WO | 2014-069923 A1 | 5/2014 |
| WO | 2014-088002 A1 | 6/2014 |

OTHER PUBLICATIONS

KR 855665—English Abstract (Year: 2008).*
KR-101507658—Machine Translation (Year: 2015).*
Extended European Search Report for European Patent Application No. 18889445.5 dated Jul. 28, 2021, 7 pages.
Office Action for corresponding Japanese Patent Application No. 2020-531511 dated Jun. 22, 2021, 4 pages.
Tetsuya Oguma, "Microorganisms in soy sauce and miso", Modern Media, 2015, pp. 298-304, vol. 61, No. 10, (with partial machine translation, 9 pages).
Hoon-Il Oh et al., "Changes in Quality Characteristics of Kochujang Prepared with Aspergillus oryzae, Bacillus licheniformis and *Saccharomyces rouxii* during Fermentation", Korean journal of food science and technology, vol. 31, No. 6, pp. 1570-1576 (1999).
Hoon-Il Oh et al., "Changes in Microflora and Enzyme Activities of Kochujang Prepared with Aspergillus oryzae, Bacillus licheniformis and *Saccharomyces rouxii* during Fermentation", Korean journal of food science and technology, vol. 32, No. 2, pp. 410-416 (2000).
International Search Report from International Application No. PCT/KR2018/015638, dated Mar. 14, 2019.
Written Opinion from International Application No. PCT/KR2018/015638, dated Mar. 14, 2019.
Office Action for corresponding Chinese Application No. 201880079432.2 dated Oct. 8, 2022 (9 pages).

* cited by examiner

*Primary Examiner* — Hamid R Badr
(74) *Attorney, Agent, or Firm* — Merchant & Gould P.C.

(57) ABSTRACT

The present application relates to a fermented soybean composition and a method for preparing a fermented soybean composition.

5 Claims, 3 Drawing Sheets ced SOYBEAN COMPOSITION
AND METHOD FOR PRODUCING
FERMENTED SOYBEAN COMPOSITION

This application is a National Stage Application of International Application No. PCT/KR2018/015638, filed 10 Dec. 2018, which claims benefit of Serial No. 10-2017-0170570, filed 12 Dec. 2017 in the Republic of Korea and which applications are incorporated herein by reference. To the extent appropriate, a claim of priority is made to each of the above disclosed applications.

TECHNICAL FIELD

The present application relates to a composition for fermented soybean products and a method for preparing the composition for fermented soybean products.

BACKGROUND ART

Fermented soybean products (e.g., a hot pepper paste, a seasoned soybean paste, etc.) with excellent flavors and savory tastes can be prepared by decomposing components (e.g., carbohydrates, proteins, etc.) using enzymes derived from *Aspergillus* and from fermentation products, which are produced by microorganisms.

Among various kinds of fermentation carried out during the preparation of fermented soybean products, alcohol fermentation carried out by yeast is a biological process in which saccharides (e.g., glucose, fructose, etc.) are decomposed into ethanol and carbon dioxide. The general process of preparing a half-finished fermentation product for fermented soybean products employs fermentation using raw materials with a high carbohydrate content, in which alcohol fermentation is proceeded by wild-type yeast and cultured yeast and thereby alcohol is produced from carbohydrates. The thus-produced alcohol reacts with various organic acids and thereby emits an ester aroma, which is one of the sensory quality elements in fermented soybean products.

However, the prepared fermented soybean products contain alcohol due to the alcohol fermentation that occurs during the preparation of the fermented soybean products, and the odor of the alcohol has become a cause of limiting the use of the fermented soybean products, in cases where the alcohol deteriorates the flavor of the fermented soybean products or alcohol intake is prohibited due to a religious reason, etc.

Although the alcohol in the fermented soybean products may be naturally produced during the preparation process, alcohol may additionally be added for a sterilization effect in the case of a hot pepper paste. Therefore, it has been difficult to reduce the amount of alcohol during the process of preparing fermented soybean products. To solve such a problem, conventionally, attempts had been made to accomplish a sufficient sterilization effect through sterilization under extreme conditions, instead of further heat sterilization or reduction of alcohol addition; however, no attempt has been made to reduce the production of alcohol itself in the Korean-style paste.

DISCLOSURE OF THE APPLICATION

Technical Problem

To solve the above-described limitations, an object of the present application provides a composition for fermented soybean products containing a fermentation product, in which a carbohydrate raw material is fermented with at least one microorganism selected from *C. utilis, S. fragilis, S. lactis, S. pombe*, and *Z. rouxii*, wherein the fermentation product comprises alcohol in an amount of 0.01 v/v % to 4.0 v/v %.

Additionally, another object of the present application provides a method for preparing a composition for fermented soybean products, which includes: mixing a koji, which is prepared with a first carbohydrate raw material containing wheat flour, with a steamed product, which is steamed by adding water to a second carbohydrate raw material containing at least one selected from the group consisting of wheat rice, whole wheat, *quinoa*, and defatted soy flour; fermenting the mixture to at least one microorganism of *C. utilis, S. fragilis, S. lactis, S. pombe*, and *Z. rouxii*; and mixing the fermentation product, which has undergone the fermentation process, with at least one selected from the group consisting of hot pepper powder, starch sugar, soy sauce, salt, processed spices, flavor enhancers, natural antibacterial agents, and processed cereals, and aging the mixture.

Technical Solution

Hereinafter, the present application will be described in detail.

To achieve the above objects, an aspect of the present application may be to provide a composition for fermented soybean products containing a fermentation product, in which a carbohydrate raw material is fermented with at least one microorganism selected from *C. utilis, S. fragilis, S. lactis, S. pombe*, and *Z. rouxii*, wherein the fermentation product comprises alcohol in an amount of 0.01 v/v % to 4.0 v/v %.

The carbohydrate raw material may contain wheat flour, as a first carbohydrate raw material; and at least one selected from the group consisting of wheat rice, whole wheat, *quinoa*, and defatted soy flour, as a second carbohydrate raw material.

Conventional compositions for fermented soybean products were prepared only by a process of fermenting high carbohydrate raw material, and thus the compositions for fermented soybean products had a high alcohol content thereby producing alcohol odor. However, in the present application, as a carbohydrate raw material, a first carbohydrate raw material and a second carbohydrate raw material, which has a low carbohydrate content, are mixed and used. As a result, the carbohydrate content of the raw material can be lowered thereby being capable of the content of alcohol, which is produced by the decomposition of glucose during a fermentation process, and thus the present application has an effect of being capable of reducing the alcohol odor of the thus-prepared composition for fermented soybean products (see Experimental Example 1). Specifically, wheat flour and wheat rice have a carbohydrate content of 70 wt % to 80 wt %; and whole wheat, *quinoa*, and defatted soy flour have a carbohydrate content of 20 wt % to 50 wt %. Additionally, optionally, the first carbohydrate raw material may be a koji prepared with wheat flour.

Additionally, the carbohydrate raw material may be one which contains 10 to 50 parts by weight of the second carbohydrate raw material, and specifically 20 to 40 parts by weight, based on 100 parts by weight of the first carbohydrate raw material. When the second carbohydrate raw material is contained less than 10 parts by weight, it is difficult to obtain an effect of reducing the alcohol content according to the decrease of a carbohydrate content, whereas when the second carbohydrate raw material is contained more than 50 parts by weight, the fermentation described later may require long hours.

Additionally, the fermentation product may be one in which a carbohydrate raw material is fermented with at least one microorganism selected from *C. utilis, S. fragilis, S. lactis, S. pombe*, and *Z. rouxii*, and specifically *C. utilis*. The fermentation product can reduce the activity of an alcohol-producing microorganism, by dominating a low alcohol producing yeast via its inoculation, so as to inhibit the alcohol production by wild-type yeast and cultured yeast characterized by alcohol production. Among these microorganisms, *Candida utilis* (*C. utilis*) is a yeast, which has other names (e.g., *Torulopsis utilis, Torula utilis, Cyberlindnera jadinii*, and *Pichia jadinii*), that can contain a large amount of glutamic acid and can be used in cheese fermentation. Additionally, *Saccharomyces fragilis* (*S. fragilis*) is a yeast, which has other names (e.g., *Kluyveromyces fragilis, Kluyveromyces marxianus*, and *Saccharomyces marxianus*), that can ptofuvr alcohol, carbonic acid gas, etc. by fermentation of sugar. Additionally, *Saccharomyces lactis* (*S. lactis*) is a yeast, which has another name, i.e., *Kluyveromyces lactis*, and it can produce lactic acid or alcohol by fermentation of lactose, and can be used in cheese fermentation, etc. Meanwhile, *Schizosaccharomyces pombe* (*S. pombe*) is a yeast, which has another name, i.e., *Schizosaccharomyces malidevorans*, and it is mostly used in alcohol fermentation, and its ability of alcohol production is about a half that of *Saccharomyces cerevisiae*. Additionally, *Zygosaccharomyces rouxii* (*Z. rouxii*) is a yeast, which has another name, i.e., *Kluyveromyces osmophilus*, and it is a halophile that forms films and is mostly used in the fermentation of fermented soybean products (e.g., soybean paste). In particular, in the case of a carbohydrate fermentation product fermented by *C. utilis*, the product has a low alcohol content in the fermentation product, and even in the a case of a composition for fermented soybean products (a hot pepper paste) prepared using such a fermentation product, the product has a low alcohol content in the fermentation product (see Experimental Example 2).

The fermentation of the carbohydrate raw material may be carried out at a temperature of 20° C. to 60° C., specifically at 30° C. to 50° C., for 1 to 50 days, and specifically 1 to 5 days. Under the above fermentation conditions, a composition for fermented soybean products having a lower alcohol content compared to the conventional composition for fermented soybean products can be prepared. In particular, when the fermentation is carried out at a temperature of 30° C. to 50° C. for 1 to 5 days, the alcohol content in the composition for fermented soybean products can be further lowered while maintaining the quality of the composition for fermented soybean products, by terminating the fermentation before the reducing sugar, which was generated by the decomposition of carbohydrates, is fermented to alcohol.

Additionally, the fermentation product may be one which is fermented by further containing at least one kind of natural antimicrobial agent selected from the group consisting of a complex herb extract and a garlic concentrate. The natural antimicrobial agent may be those which can inhibit alcohol production by inhibiting growth and activity of yeast, and may include any known material that can achieve the above object, and specifically, in consideration of the flavor, etc. of a fermentation product or composition for fermented soybean products, at least any one selected from a complex herb extract C and a garlic concentrate, and more specifically, in consideration of the amount of alcohol production, a complex herb extract C and a garlic concentrate may be used in combination. The complex herb extract C, in which the constituting elements (i.e., gingerol of ginger, catechin of green tea, and liquiritigenin of licorice) act as natural food-preserving components with high antimicrobial activity, and the garlic concentrate exhibits an action of inhibiting the growth of fungi, bacteria, and yeast, due to the unstable characteristic of allicin of garlic, has an effect of inhibiting alcohol fermentation within the composition for fermented soybean products (see Experimental Example 3). Specifically, the natural antimicrobial agent may be contained in a range of greater than 0 parts by weight to 4 part by weights, more specifically 1 to 3 parts by weight, and most specifically, 1 part by weight of a complex herb extract C and 1 part by weight of a garlic concentrate, based on 100 parts by weight carbohydrate raw material. When the natural antimicrobial agent is contained outside the above range, it may be difficult to obtain the effect of inhibiting alcohol production or the yeast growth may be excessively inhibited.

The fermentation product may be contained in an amount of 0.01 v/v % to 4.0 v/v %, specifically 0.01 v/v % to 2.0 v/v %, more specifically 0.01 v/v % to 1.0 v/v %, and most specifically 0.01 v/v % to 0.05 v/v %. As described above, the fermentation product is characterized in that raw materials with a low carbohydrate content are applied and fermented with a microorganism which produces a less amount of alcohol, and thus the fermentation product does not emit an alcohol odor while being able to maintaining the flavor of the conventional composition for fermented soybean products.

The composition for fermented soybean products may be one which can be used as a sauce among the fermentation products of a carbohydrate raw material, specifically, a Korean food-style composition for fermented soybean products including at least one kind selected from a soybean paste ("Doenjang" in Korean), a hot pepper paste ("Gochujang" in Korean), and a seasoned soybean paste ("Ssamjang" in Korean). The conventional composition for fermented soybean products were prepared by producing alcohol as a metabolic product of a fermentation microorganisms, or by adding alcohol in consideration of antimicrobial action, etc. and the thus-prepared composition for fermented soybean products had an alcohol odor thus deteriorating its flavor, and the use of fermented soybean products could be limited where alcohol intake is prohibited due to a religious reason, etc. However, the composition for fermented soybean products is not the one where the alcohol odor is not removed by processing a prepared composition for fermented soybean products, but the one where the alcohol of a fermentation product is reduced, that is, the alcohol odor is reduced by adjusting the alcohol production during the process of preparing the composition for fermented soybean products.

Another aspect of the present application provides a method for a method for preparing a composition for Korean-style pastes, which includes: mixing a koji, which is prepared with a first carbohydrate raw material containing wheat flour, with a steamed product, which is steamed by adding water to a second carbohydrate raw material containing at least one selected from the group consisting of wheat rice, whole wheat, *quinoa*, and defatted soy flour; fermenting the mixture to at least one microorganism of *C. utilis, S. fragilis, S. lactis, S. pombe*, and *Z. rouxii*; and mixing the fermentation product, which has undergone the fermentation process, with at least one selected from the group consisting of hot pepper powder, starch sugar, soy sauce, salt, processed spices, flavor enhancers, natural antibacterial agents, and processed cereals, and aging the mixture.

The step of mixing is a step of mixing a koji, which is prepared with a first carbohydrate raw material containing wheat flour, with a steamed product, which is steamed by adding water to a second carbohydrate raw material containing at least one selected from the group consisting of wheat rice, whole wheat, *quinoa*, and defatted soy flour.

Koji is one which is prepared with a first carbohydrate raw material containing wheat flour, and specifically, may be one which is prepared by mixing *Aspergillus* in an amount of 0.01 to 0.1 parts by weight based on 100 parts by weight of a first carbohydrate raw material, and the alcohol content in the composition for fermented soybean products can be further reduced by shortening the fermentation period in the fermentation step described later. Additionally, the steamed product may be one which is prepared by adding water (immersion) to at least one kind of a second carbohydrate raw material selected from the group consisting of wheat rice, whole wheat, *quinoa*, and defatted soy flour, followed by steaming, and gelatinization. Specifically, the water addition (immersion) is a step of soaking the second carbohydrate raw material in water, and 50 wt % to 100 wt % of purified water based on the total weight of the second carbohydrate raw material is added to the second carbohydrate raw material and immersed for 60 to 180 minutes, and specifically 60 wt % to 90 wt % of purified water is added to the second carbohydrate raw material and immersed for 90 to 150 minutes. Outside the above range, the second carbohydrate raw material is not sufficiently soaked and thus the quality of the composition for fermented soybean products may be deteriorated. The steaming is a step of saturation steaming of the second carbohydrate raw material, which underwent water addition, and the water is discharged under atmospheric pressure and achieved by injecting a high-pressure steam and discharging condensed water and excess water. The step of steaming may be carried out under a high-pressure steam of 0.5 kgf/cm$^2$ to 1.5 kgf/cm$^2$ for 3 to 20 minutes, and specifically, under a high-pressure steam of 0.8 kgf/cm$^2$ to 1.3 kgf/cm$^2$ for 5 to 15 minutes.

Additionally, the step of mixing may further mix a natural antimicrobial agent. The natural antimicrobial agent is the same as the natural antimicrobial agent to be contained in the composition for fermented soybean products described above.

The step of fermenting is a step of fermenting a mixture which underwent a step of mixing, and the mixture may be fermented with at least one microorganism among *C. utilis, S. fragilis, S. lactis, S. pombe*, and *Z. rouxii*, and specifically with *C. utilis*. The characteristics of each microorganism are the same as those to be included in the composition for fermented soybean products described above.

Additionally, the step of fermentation may be carried out at a temperature of 20° C. to 60° C., specifically at 30° C. to 50° C., for 1 to 50 days, and specifically for 1 to 5 days. The fermentation conditions are those that can further reduce the alcohol content within the composition for fermented soybean products and are the same as the fermentation of the composition for fermented soybean products described above (see Experimental Example 3).

The preparation method of the present application may further include a step of sterilization after the step of aging. The preparation method can sterilize and perform a bacteriostatic action and thereby inhibit additional alcohol fermentation during storage and distribution thereby improving the quality of the composition for fermented soybean products. Specifically, the composition for fermented soybean products may be sterilized at a temperature of 55° C. to 85° C. for 1 to 60 minutes.

The method of preparing the composition for fermented soybean products of the present application has an effect of preparing a composition for fermented soybean products with a low alcohol content within a short period of time, through the control of the alcohol-fermenting microorganism through the application of raw materials with a low carbohydrate content, and application of a low alcohol producing microorganism, as well as the control of fermentation conditions through the fermentation with high-temperature and shortened period and application of a natural antimicrobial agent.

Advantageous Effects

The present application has an effect of providing a composition for fermented soybean products with a low alcohol content within a short period of time while maintaining the flavor of the conventional composition for fermented soybean products.

Additionally, the method of preparing the composition for fermented soybean products of the present application has an effect of preparing a composition for fermented soybean products with a low alcohol content within a short period of time, through the control of the alcohol-fermenting microorganism through the application of raw materials with a low carbohydrate content, and application of a low alcohol producing microorganism, as well as the control of fermentation conditions through the fermentation with high-temperature and shortened period and application of a natural antimicrobial agent.

MODE FOR CARRYING OUT THE APPLICATION

Figure 1:
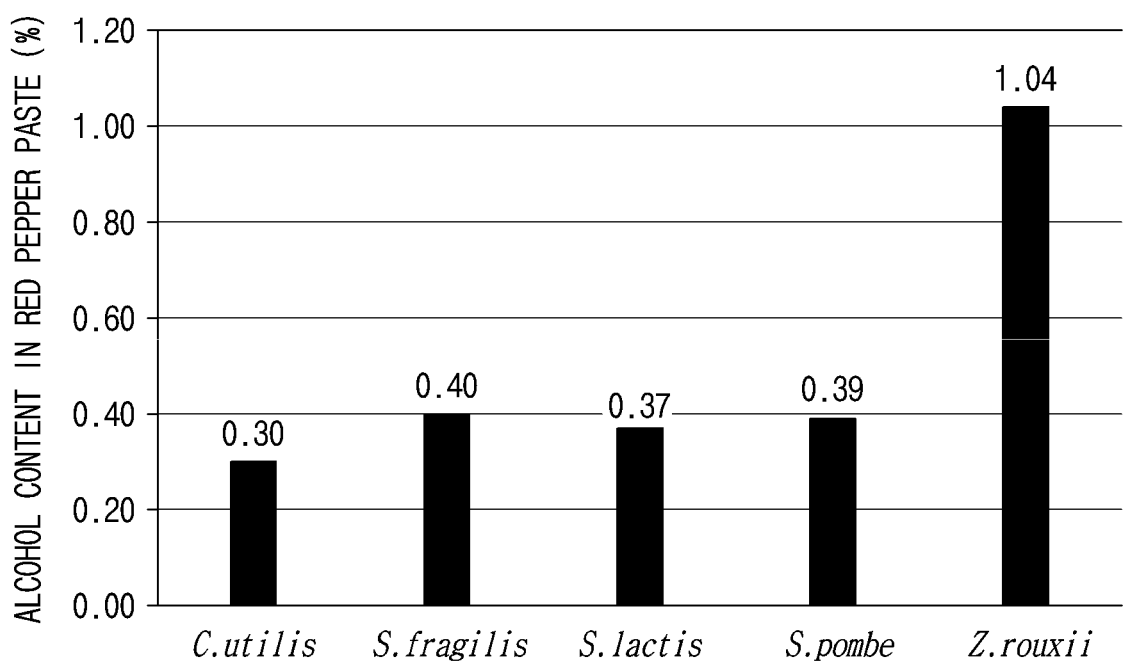
FIG. 1 is a graph illustrating the alcohol content in a hot pepper paste according to microorganisms of Experimental Example 2.

Hereinafter, the present application will be described in more detail through Examples. However, these Examples are illustrative of the present application and the scope of the present application is not limited to these Examples.

In the following Examples, the alcohol content was obtained by the vibration density method after distillation according to the regulations of the liquids by the Ministry of Food and Drug Safety of Korea, multiplied by the dilution factor. The moisture content was analyzed by the atmospheric pressure heating drying method and the amino acid nitrogen content was analyzed by the formal titration method (Sorensen method). The reducing sugar content was obtained by calculating based on the glucose level after the analysis by the Somogyi-nelson method.

[Experimental Example 1] Selection of Raw Materials with Low Carbohydrate Content for Low Alcohol Production For the low alcohol production during the process of preparing a composition for fermented soybean products, raw materials with low carbohydrate content were confirmed. Specifically, in consideration of a hot pepper paste, wheat flour (CJ CheilJedang, Products of USA/Canada/Australia) was prepared as a first carbohydrate raw material, and wheat rice (Korea Industry, Product of USA), whole wheat (Mingafood, Product of Korea), *quinoa* (Organica Inc., Product of USA), and defatted soy flour (Kong-G, Co., Ltd., Product of China) were prepared as a second carbohydrate raw material.

Water was added to the koji containing wheat flour and a second carbohydrate raw material, mixed with a steamed product steamed under 1.1 MPa (Kgf/cm$^2$) for 7 minutes, inoculated with *C. utilis*, and fermented at 25° C. The specific ratios of raw materials (weight ratio) are shown in Table 1 below.

TABLE 1

Experimental sections according to carbohydrate raw materials

|  | Experimental Section 1-1 | Experimental Section 1-2 | Experimental Section 1-3 | Experimental Section 1-4 |
|---|---|---|---|---|
| Wheat Flour | 100 | 100 | 100 | 100 |
| Wheat Rice | 15 | — | — | — |
| Whole Wheat | — | 15 | — | — |
| Defatted Soy Flour | — | — | 15 | — |
| Quinoa | — | — | — | 15 |
| Refined Salt | 15 | 15 | 15 | 15 |

The prepared fermentation product was collected on day 1, 3, 5, 7, and 12 of the fermentation to measure their alcohol contents, and the results are shown in Table 2 below.

TABLE 2

Results of alcohol analysis per fermentation period according to carbohydrate raw materials

| Experimental Section | Fermentation Period (days) | Experimental Section 1-1 | Experimental Section 1-2 | Experimental Section 1-3 | Experimental Section 1-4 |
|---|---|---|---|---|---|
| Alcohol (v/v %) | 1 | 0.00 | 0.02 | 0.00 | 0.00 |
|  | 3 | 0.04 | 0.04 | 0.02 | 0.00 |
|  | 5 | 0.12 | 0.20 | 0.14 | 0.20 |
|  | 7 | 0.98 | 0.52 | 1.10 | 1.04 |
|  | 12 | 2.52 | 1.78 | 2.34 | 2.10 |

Comparing Experimental Section 1-1 with Experimental Sections 1-2 to 1-4, on day 3, Experimental Section 1-2 showed an alcohol content at the same level as that of Experimental Section 1-1, whereas Experimental Section 1-3 and Experimental Section 1-4 showed lower alcohol contents compared to Experimental Section 1-1.

On day 5 of the fermentation, Experimental Section 1-1 showed an alcohol content similar to Experimental Section 1-3.

On day 12 of the fermentation, Experimental Section 1-2 showed the lowest alcohol content among the Experimental Sections.

Taken together, it was confirmed that when a raw material with a low carbohydrate content was applied during the process of manufacturing a hot pepper paste, the alcohol content in the fermentation product was reduced, and in particular, whole wheat and *quinoa*, as the second carbohydrate raw material, had an excellent effect of reducing alcohol production.

[Experimental Example 2] Selection of Low Alcohol Producing Yeast

Yeast which is suitable for the process of preparing fermented soybean products and enables low alcohol production was confirmed. This yeast is to reduce the activity of an alcohol producing microorganism for the inhibition of alcohol production by wild-type yeast and cultured yeast, which are characterized by alcohol production, by dominating a low alcohol producing yeast via its inoculation.

Specifically, in consideration of a hot pepper paste, the yeast derived from edible and food fermentation or dairy fermentation was selected as shown in Table 3, by referring to Korean Food Standards Codex.

TABLE 3

List of selected yeasts

| Experimental Section | Scientific Name | Other Names | Characteristics of Yeast |
|---|---|---|---|
| 2-1 | *Candida utilis* | *Torulopsis utilis*, *Torula utilis*, *Cyberlindnera jadinii*, *Pichia jadinii* | MSG, cheese curd |
| 2-2 | *Saccharomyces fragilis* | *Kluyveromyces fragilis*, *Kluyveromyces marxianus*, *Saccharomyces marxianus* | high temperature alcohol fermentation yeast |
| 2-3 | *Saccharomyces lactis* | *Kluyveromyces lactis* | alcohol production using lactose as a main source |
| 2-4 | *Schizosaccharomyces pombe* | *Schizosaccharomyces malidevorans* | wine, lower alcohol producing ability than *S. cerevisiae* by ½ |
| 2-5 | *Zygosaccharomyces rouxii* | *Kluyveromyces osmophilus* | halophile, film yeast |

The salt resistance of the above yeasts in the prepared fermentation products was examined to confirm the suitability in the process of preparing fermented soybean products. Specifically, the microorganisms in Table 3 were cultured under the conditions of 30° C. by using the fermentation product of Experimental Example 1, and as a result, it was confirmed that all of the selected yeasts had an appropriate level of salt resistance during the process of preparing fermented soybean products.

Additionally, the yeast of Table 4 was inoculated to the carbohydrate raw material of Experimental Section 1-1 at a density of 5.0×10$^8$ cells while preparing by the method described in Experimental Example 1, and on day 14 of the fermentation, the contents of alcohol, reducing sugar, and the amino acid nitrogen content was measured, and the results are shown in Table 4 below.

With regard to the alcohol content of the fermentation product on day 14 of the fermentation, Experimental Section 2-1, in which *C. utilis* was inoculated and fermented, showed the lowest alcohol content, as shown in Table 4. Additionally, with regard to the amino acid nitrogen content in the fermentation product, which is one of the indices that can confirm the characteristics of fermentation (hereinafter, Amino nitrogen), the fermentation product of Experimental Section 2-1 showed a slightly higher Amino nitrogen, but showed similar values over the entire Experimental Sections, as shown in Table 4 below.

TABLE 4

Alcohol content of fermentation product when applying low alcohol producing yeast, and results of quality analysis

| Experimental Section | Alcohol (%) | Reducing Sugar (%, glucose-based) | Amino nitrogen (mg %) |
|---|---|---|---|
| 2-1 | 1.26 | 14.57 | 288.95 |
| 2-2 | 1.62 | 14.68 | 265.89 |
| 2-3 | 1.38 | 14.19 | 271.51 |
| 2-4 | 1.74 | 15.27 | 269.05 |
| 2-5 | 3.45 | 12.45 | 260.31 |

Additionally, a hot pepper paste was prepared according to the method for preparing commercial hot pepper pastes in the market, and the results are shown in FIG. 1. Even when a natural antimicrobial agent was applied, it was confirmed that the hot pepper paste in which C. utilis was applied showed a low alcohol content.

As a result, it was confirmed that the effect of reducing alcohol production was most excellent when C. utilis was used.

[Experimental Example 3] Selection of Conditions for Fermentation with Low Alcohol Production A process, by which a less amount of alcohol can be produced while the quality of fermented soybean products can be maintained, during the process of preparing fermented soybean products where raw materials are fermented for 1 to 30 days, was confirmed. Specifically, a process, by which alcohol producing action is inhibited while the fermentation period can be shortened by the application of high-temperature, short-term fermentation process and a natural antimicrobial agent, was confirmed.

(1) Selection of Conditions for Fermentation with Low Alcohol Production

A fermentation product was prepared through the preparation method of Experimental Example 1 using the raw materials and yeast microorganism of Experimental Section 1-1, except that Experimental Section 3-1 was fermented and cured at 25° C. and Experimental Section 3-2 was fermented and cured at 45° (constant temperature room) (see Table 5), and the alcohol content at the time point of termination of fermentation (fermentation was terminated based on the time point where all Experimental Sections reached a similar quality level) was compared and analyzed (see Table 6).

TABLE 5

Fermentation conditions

| Experimental Section | Raw Materials | Fermentation Temperature (° C.) | Fermentation Period (days) |
|---|---|---|---|
| 3-1 | wheat flour (100 parts by weight) wheat rice (15 parts by weight) refined salt (15 parts by weight) | 25 | 14 |
| 3-2 | | 45 | 3 |

TABLE 6

Results of quality analysis according to fermentation conditions

| Experimental Section | Fermentation Period (days) | Reducing Sugar (%, glucose-based) | Alcohol (%) |
|---|---|---|---|
| Initial Values of Two Experimental Sections | 0 | 13.96 | 0.00 |
| 3-1 | 14 | 12.45 | 3.45 |
| 3-2 | 3 | 18.77 | 0.08 |

Experimental Section 3-1 showed a decrease of the content of reducing sugar on day 14, which is the termination point of fermentation, by about 1.5% compared to the initial value, and the alcohol content reached 3.45%, thus confirming that the free sugar of the fermentation product was converted to alcohol and the content of reducing sugar was reduced. Experimental Section 3-2 reached the content of reducing sugar of 18.77% on day 3, which is the termination point of fermentation, thus showing an increase compared to the initial value, and showed the alcohol content of 0.08%, which was not significantly different from the initial value, thus confirming that the conversion into alcohol was minimized.

Accordingly, it was confirmed that the high-temperature (45° C.) fermentation condition is a condition advantageous for increasing the rate of reducing sugar production (decomposition of carbohydrates) compared to the medium-temperature (25° C.) fermentation condition thereby shortening the fermentation period, and preventing the increase of the alcohol content by the fermentation of sugar components.

(2) Sensory Evaluation According to Fermentation Conditions with Low Alcohol Production Hot pepper pastes were prepared according to the method for preparing the commercial hot pepper pastes available in the market using the fermentation products of Experimental Sections 3-1 and 3-2.

Nine panelists were subjected to a blind sensory test on a 5-point scale after, and the results are shown in Tables 7 and 8. As a result of the sensory evaluation of the hot pepper paste of Experimental Section 3-2, it was confirmed that no statistical significance was shown with respect to preference and intensity on overall taste and detailed taste attributes (sweet taste, savory taste, and spicy taste) compared to the commercial hot pepper pastes (in the case of p-value<0.05, the difference was of significance). That is, it was confirmed that the identity of traditional foods could be maintained even if a high-temperature fermentation is performed to reduce alcohol production.

TABLE 7

Preference according to results of sensory evaluation of hot pepper pastes according to fermentation conditions

| | Use of Experimental Section 3-1 | Use of Experimental Section 3-2 | p-value |
|---|---|---|---|
| Overall Taste | 3.78 | 4.11 | 0.282 |
| Sweet Taste | 3.89 | 3.78 | 0.692 |
| Savory Taste | 3.78 | 4.00 | 0.472 |
| Spicy Taste | 3.78 | 3.94 | 0.527 |

TABLE 8

Detailed intensity of taste attributes as the results of sensory
evaluation of hot pepper paste according to fermentation conditions

|  | Use of Experimental Section 3-1 | Use of Experimental Section 3-2 | p-value |
| --- | --- | --- | --- |
| Sweet Taste | 3.44 | 3.56 | 0.769 |
| Savory Taste | 3.39 | 3.67 | 0.475 |
| Spicy Taste | 4.00 | 3.50 | 0.128 |

(3) Confirmation of Low Alcohol Production at Fermentation Step According to an Addition of a Natural Antimicrobial Agent Fermentation products were prepared through the method of Experimental Example 1 using the raw materials of Experimental Section 1-1, except that a natural antimicrobial agent was applied before the fermentation step, and Experimental Section 3-(natural antimicrobial agent not added), Experimental Section 3-4 (complex herb extract C: 2 parts by weight), Experimental Section 3-5 (garlic concentrate: 2 parts by weight), Experimental Section 3-6 (complex herb extract C (1 parts by weight) and garlic concentrate (1 part by weight)) were varied according to the content of the natural antimicrobial agent (based on 100 parts by weight of the carbohydrate raw material), and the fermentation was completed based on the time point where all of the Experimental Sections reached a similar quality level. The contents of the reducing sugar and alcohol at the time point of termination of fermentation (see Table 10, FIGS. 2 and 3).

TABLE 9

Conditions for application of natural antimicrobial agent

| Experimental Section | Constituting Element | Fermentation Temperature (° C.) | Fermentation Period (days) |
| --- | --- | --- | --- |
| 3-3 (Natural antimicrobial agent, not applied) | wheat flour (100 parts by weight) wheat rice (15 parts by weight) refined salt (15 parts by weight) | 25 | 21 |
| Natural antimicrobial agent applied — 3-4 (Complex herb extract C: 2 parts by weight) | | | |
| 3-5 (a garlic concentrate: 2 parts by weight) | | | |
| 3-6 (complex herb extract C: 1 part by weight + garlic concentrate: 1 part by weight) | | | |

TABLE 10

Results of quality analysis of Experimental Sections where natural
antimicrobial agent was applied according to fermentation period

| Experimental Section | Fermentation Period (days) | Reducing Sugar (%, glucose-based) | Alcohol (%) |
| --- | --- | --- | --- |
| Initial Value | 0 | 13.96 | 0.00 |
| 3-3 (natural antimicrobial agent, not applied) | 21 | 17.53 | 1.14 |
| 3-4 (complex herb extract C: 2 parts by weight) | | 17.93 | 1.33 |
| 3-5 (garlic concentrate: 2 parts by weight) | | 19.39 | 1.21 |
| 3-6 (complex herb extract C: 1 part by weight) + garlic concentrate: 1 part by weight) | | 19.88 | 0.43 |

Figure 2:
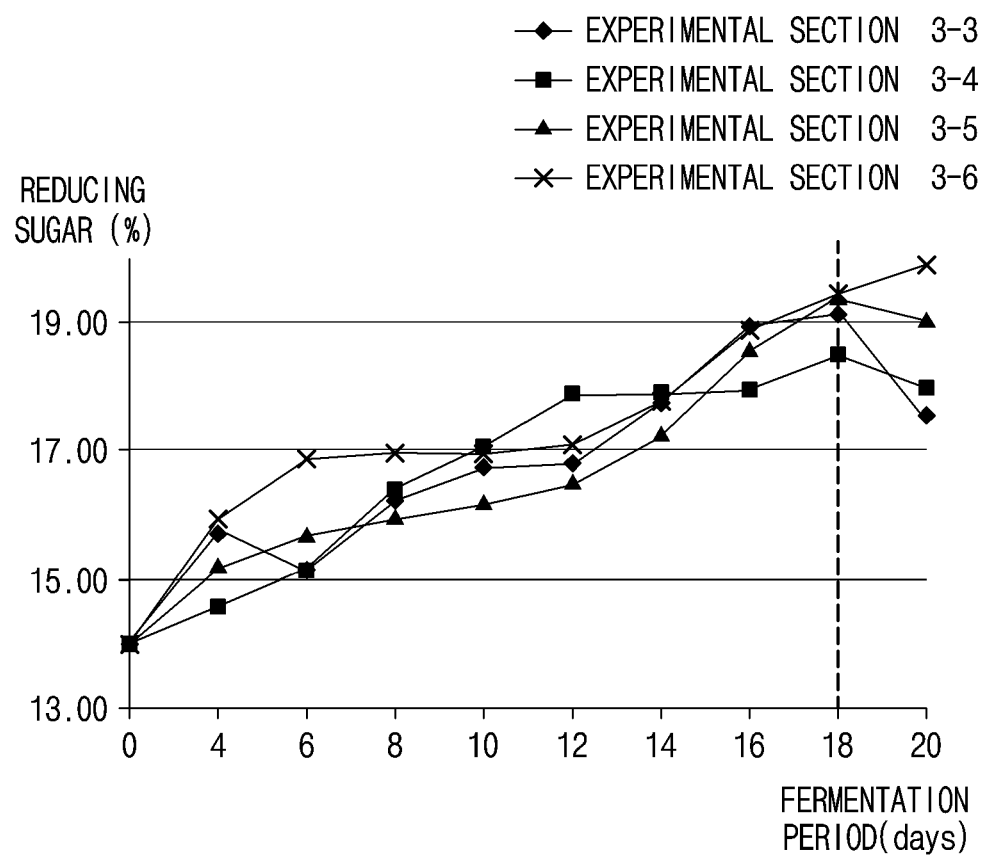
FIG. 2 is a graph illustrating the changes in reducing sugar content according to the presence of application of a natural antimicrobial agent and the fermentation period in Experimental Example 3.
Figure 3:
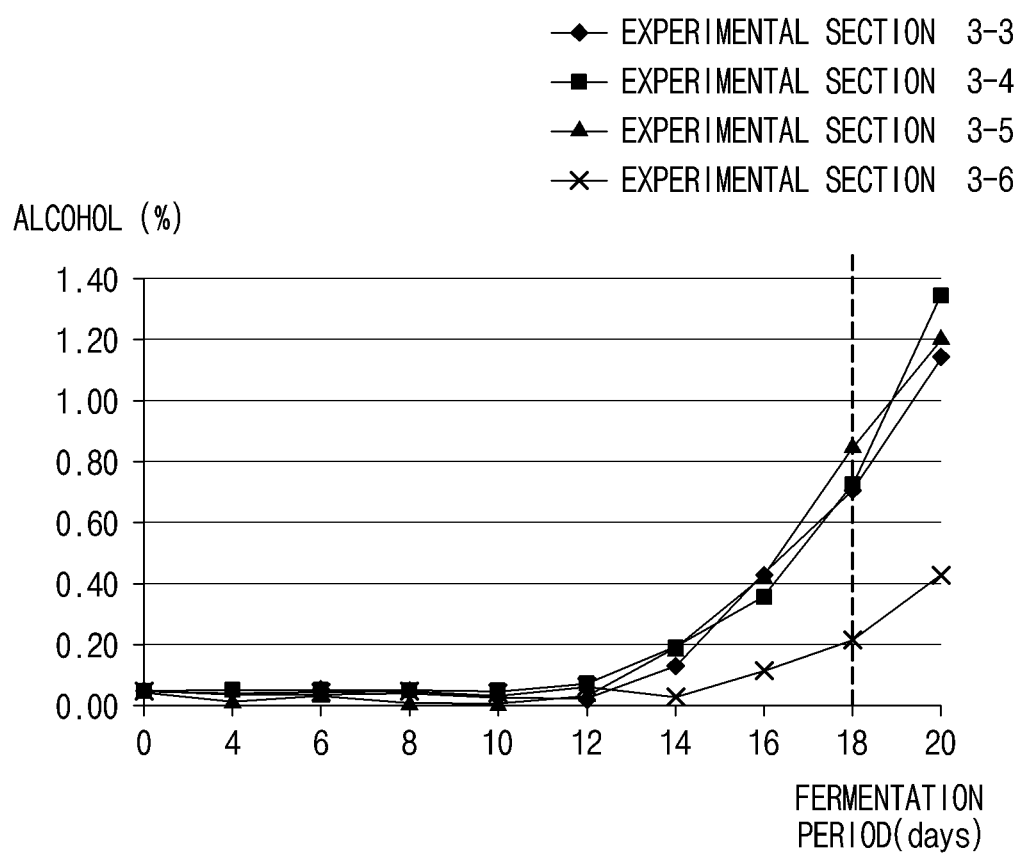
FIG. 3 is a graph illustrating the changes in alcohol content according to the presence of application of a natural antimicrobial agent and the fermentation period in Experimental Example 3.

As shown in FIGS. 2 and 3, Experimental Section 3-3, Experimental Section 3-4, and Experimental Section 3-5 showed a trend of decreasing the content of reducing sugar, based on day 18 where the value of the alcohol content was rapidly increased to a level of 1% or greater, whereas Experimental Section 3-6 showed a continuous increase in the content of reducing sugar, but the increase rate of the alcohol content was shown to be small to be less than 0.5%. These results are thought to have occurred because, in Experimental Section 3-3, Experimental Section 3-4, and Experimental Section 3-5, as the fermentation period became longer, the free sugar of the fermentation product was converted to alcohol and the content of the reducing sugar was reduced, as was the case with the high-temperature fermentation aging experiment. Experimental Section 3-4, in which the alcohol content was highest to be 1.33%, the constituting raw materials of the complex herb extract C consists of a licorice extract, a tea extract, ginger concentrate powder, powdered crystalline glucose, and it is thought that the alcohol conversion was highest due to the influence of the powdered crystalline glucose.

Based on these results, it was confirmed that the respective application of the complex herb extract C and the garlic concentrate as candidate materials of natural antimicrobial agents were not significantly effective against the inhibition of alcohol production, and it was confirmed that the inhibitory effect was significant when these two materials were used together. This is thought to have occurred because the constituting elements of the complex herb extract C, that is, the gingerol of ginger, catechin of green tea, and liquiritigenin of licorice act as food preserving components with high antimicrobial activity, and the allicin of garlic, due to its unstable properties, exhibits an inhibitory action against the growth of fungi, bacteria, and yeast.

[Experimental Example 4] Selection of Optimal Conditions for Fermentation with Low Alcohol Production To establish the optimum conditions for low alcohol production during the process of preparing fermented soybean products, the conditions for low alcohol production confirmed in Experimental Examples 1 to 3 were combined and thereby the alcohol production was confirmed. Specifically, the fermentation was applied under the compositions and conditions shown in Table 11 below.

The fermentation was terminated based on the time point where all of Experimental Sections reached a similar level of quality. The alcohol contents at the time point of completing the fermentation were compared (see Table 11).

TABLE 11

Experimental Section for fermentation with low alcohol production

| Experimental Section | Constituting Elements | Yeast | Fermentation Temperature (° C.) | Fermentation Period (Days) | Alcohol (v/v %) |
|---|---|---|---|---|---|
| 4-1 | wheat flour (100 parts by weight); whole wheat (15 parts by weight); refined salt (15 parts by weight) | Z. rouxii | 25 | 12 | 1.92 |
| 4-2 | | | 45 | 3 | 0.08 |
| 4-3 | | C. utilis | 25 | 12 | 0.18 |
| 4-4 | | | 45 | 3 | 0.04 |
| 4-5 | wheat flour (100 parts by weight); whole wheat (30 parts by weight); and refined salt (15 parts by weight) | C. utilis | 45 | 3 | 0.02 |

As a result of comparison of the alcohol contents of Experimental Sections 4-1 to 4-4 were compared, it was confirmed that when whole wheat (a grain having a low carbohydrate content confirmed in Experimental Examples 1 to 3), *C. utilis* (yeast with low alcohol production), and high-temperature fermentation conditions were combined, the effect of inhibiting alcohol production was most excellent. Additionally, as a result of comparison of Experimental Sections 4-4 and 4-5, it was confirmed that as the content of the grain having a low carbohydrate content was increased, it became an advantageous condition to prevent the increase of the alcohol content.

The invention claimed is:

1. A composition for fermented soybean products comprising a fermentation product in which a carbohydrate raw material, a complex herb extract C, and a garlic concentrate are fermented with at least one microorganism selected from the group consisting of *C. utilis, S. fragilis, S. lactis,* and *S. pombe*, wherein the fermentation product comprises alcohol in an amount of 0.01 v/v % to 4.0 v/v %;
wherein the carbohydrate raw material comprises:
wheat flour, as a first carbohydrate raw material; and
at least one selected from the group consisting of wheat rice, whole wheat, quinoa, and defatted soy flour, as a second carbohydrate raw material;
wherein the second carbohydrate raw material is comprised 10 to 50 parts by weight based on 100 parts by weight of the first carbohydrate raw material;
wherein the complex herb extract C comprises licorice extract, a tea extract, ginger concentrate powder, and powdered crystalline glucose.

2. The composition for fermented soybean products of claim 1, wherein the fermentation is performed at a temperature of 20° C. to 60° C.

3. A method for preparing a composition for fermented soybean products, comprising:
mixing a koji, which is prepared with a first carbohydrate raw material comprising wheat flour, with a steamed product, which is steamed by adding water to a second carbohydrate raw material comprising at least one selected from the group consisting of wheat rice, whole wheat, *quinoa*, and defatted soy flour;
adding (i) a complex herb extract C comprising licorice extract, a tea extract, ginger concentrate powder, and powdered crystalline glucose, and (ii) a garlic concentrate into the mixture;
fermenting the mixture with at least one microorganism selected from the group consisting of *C. utilis, S. fragilis, S. lactis,* and *S. pombe*, and
mixing the fermentation product, which has undergone the fermentation process, with at least one selected from the group consisting of hot pepper powder, starch sugar, soy sauce, salt, processed spices, flavor enhancers, natural antibacterial agents, and processed cereals, and aging the mixture;
wherein the second carbohydrate raw material is comprised 10 to 50 parts by weight based on 100 parts by weight of the first carbohydrate raw material.

4. The method of claim 3, wherein, in the fermenting, the mixture is fermented at 20° C. to 60° C. for 50 days.

5. The method of claim 3, wherein, in the fermenting, the mixture is fermented at 30° C. to 50° C. for 1 to 5 days.

* * * * *